April 9, 1940.    J. L. ANDERSON    2,196,180

APPARATUS FOR BUTT-WELDING PIPES AND TUBING

Filed July 27, 1935    4 Sheets-Sheet 1

INVENTOR
James L. Anderson
BY
ATTORNEY

April 9, 1940.  J. L. ANDERSON  2,196,180
APPARATUS FOR BUTT-WELDING PIPES AND TUBING
Filed July 27, 1935  4 Sheets-Sheet 2
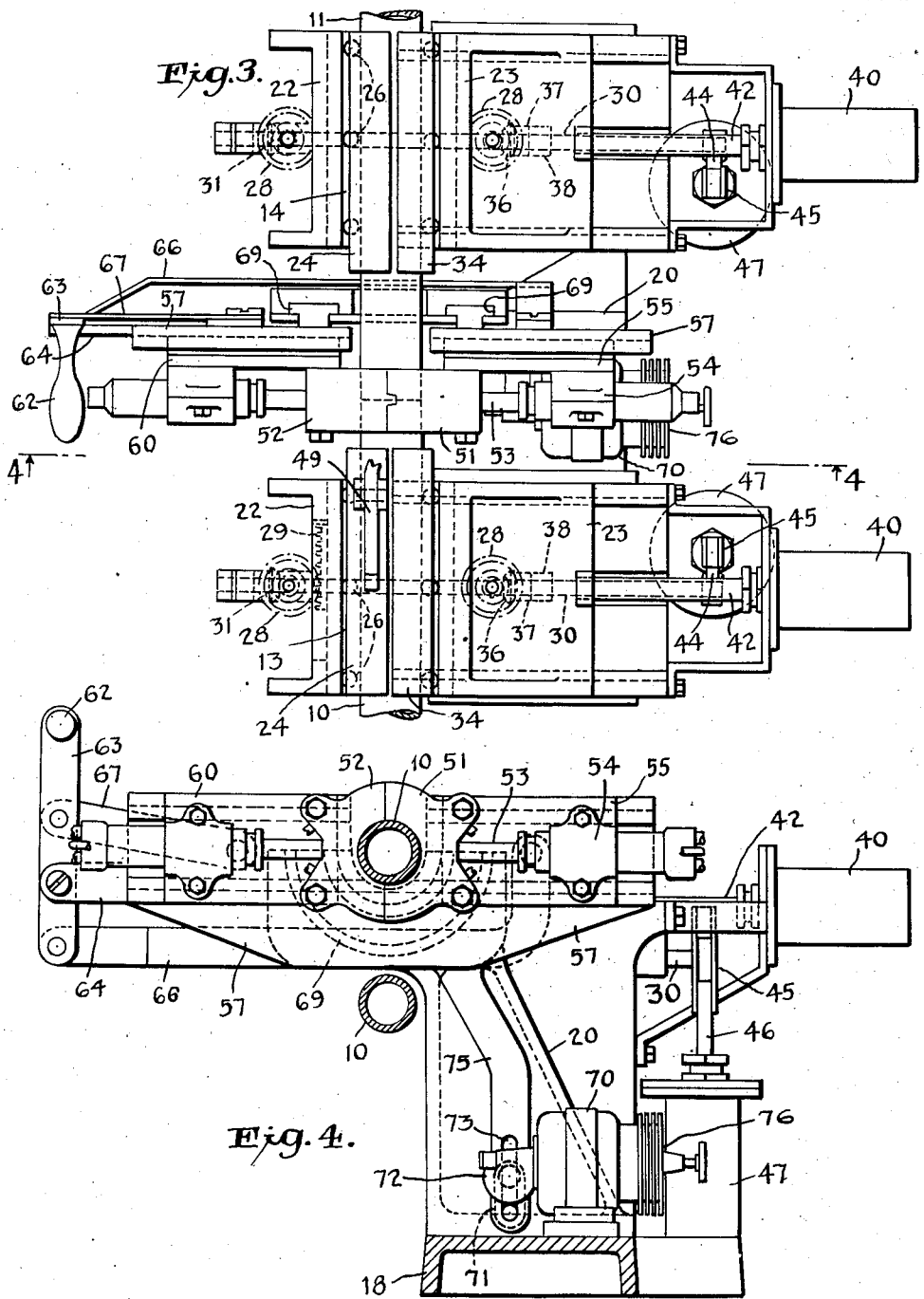

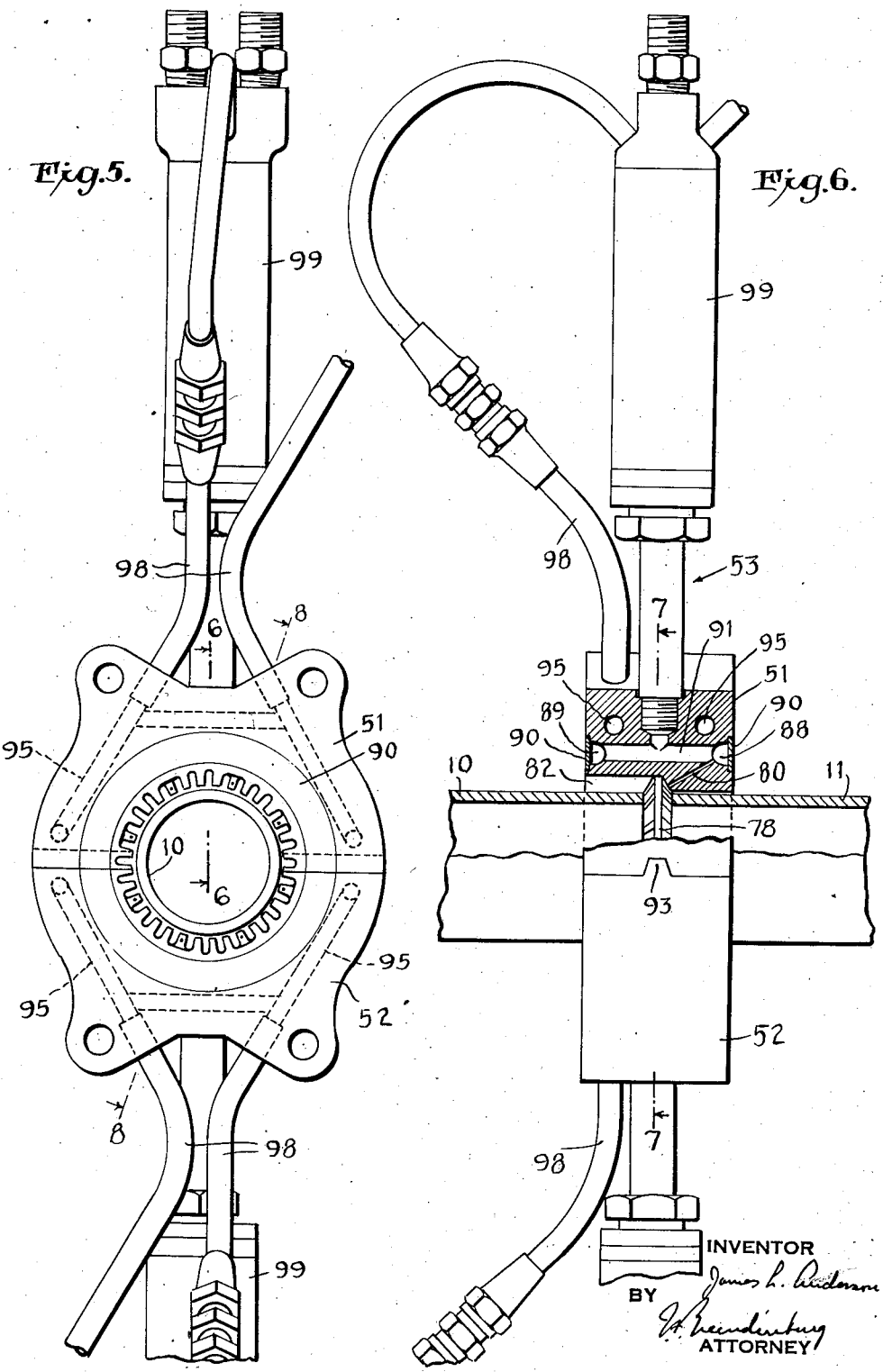

April 9, 1940.    J. L. ANDERSON    2,196,180
APPARATUS FOR BUTT-WELDING PIPES AND TUBING
Filed July 27, 1935    4 Sheets—Sheet 4
Fig.7.
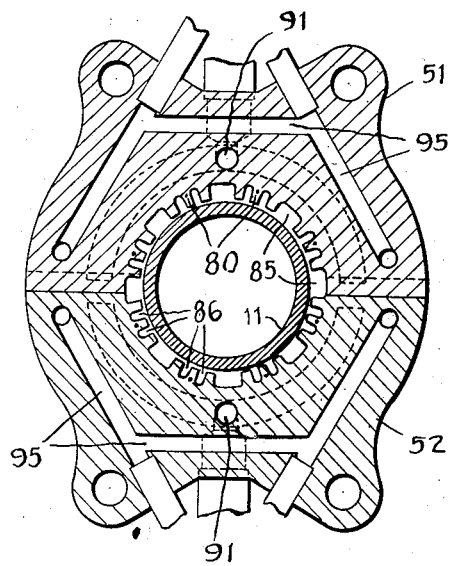
Fig.8.
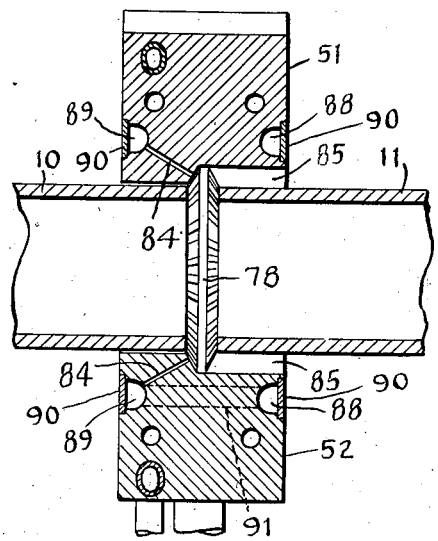
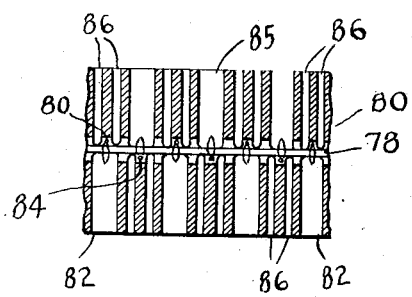
Fig.9.
INVENTOR
James L. Anderson
BY
*(signature)*
ATTORNEY Patented Apr. 9, 1940

2,196,180

UNITED STATES PATENT OFFICE 2,196,180

APPARATUS FOR BUTT-WELDING PIPES AND TUBING

James L. Anderson, Closter, N. J., assignor to Air Reduction Company, Incorporated, New York, N. Y., a corporation of New York Application July 27, 1935, Serial No. 33,549

8 Claims. (Cl. 78—84)

This invention relates to apparatus for butt-welding the ends of pipes or tubing.

One object of the invention is to provide an improved apparatus of welding together the ends of pipes and tubing by flames applied directly to the end faces of the tubing. With this apparatus the ends are exposed to direct flame heating while spaced more closely than has heretofore been the practice, and the flames are directed against the ends while they are moving together and until they are in actual contact. After the weld is made, the flames are directed against the tubing for a while longer to smooth any flash or reinforcement at the weld.

The ends of the tubing are heated by a special torch which directs a circle of flame jets against the opposing end faces of the tubing, and the torch is oscillated through an angle at least as great as the arc between successive flame jets directed against the same tube end. By this procedure the ends of the tubing are substantially uniformly heated even though it is not possible to rotate the tubes. When the circumferential seam to be welded is between sections of tubing having curves or semi-circular bends, it is often impossible to rotate the tubing in a welding machine.

Another object of the invention is to provide an improved torch for heating the opposing ends of tubing which is to be joined by welding. One feature of the improved torch is its ability to direct flame jets against both of the opposing pipe or tube ends while they are moving together and up until their faces are in actual contact. This continued heating of the end surfaces permits the tubing to be brought together gradually to make the weld, and avoids the spatter or flash which usually results when the pieces are heated while separated and then brought together as quickly as possible to avoid cooling and oxidation after the flames are withdrawn.

With this invention any type of butt-weld can be made because the apparatus will supply sufficient force for a pressure weld, and the torch will maintain the end faces in a state of incipient or actual fusion while they are brought together to make a fusion weld.

Another object of the invention is to provide improved apparatus for holding tubing while the ends are being heated and for moving the heated end faces into contact to make a weld. The preferred embodiment of the invention employs hydraulic motor means for moving the ends of the tubing together. This affords an accurate control over the movement of the tubing and provides ample force for making a pressure weld or for producing a reinforced weld if desired.

Other objects, features and advantages of the invention will appear or be pointed out as the specification proceeds.

In the accompanying drawings, forming part hereof:

Fig. 3 is a top plan view of the machine shown in the preceding views;

Fig. 4 is a sectional view on the line 4—4 of Figs. 1 and 3;

Fig. 5 is an enlarged end view of the torch shown in Figs. 3 and 4;

Fig. 6 is a side view of the torch illustrated in Fig. 5, with a part of the torch shown in section along the line 6—6;

Fig. 7 is a sectional view on the line 7—7 of Fig. 6;

Fig. 8 is a sectional view on the line 8—8 of Fig. 5; and

Fig. 9 is a development along the circle of the jet orifices of a portion of the torch.

Figure 1:
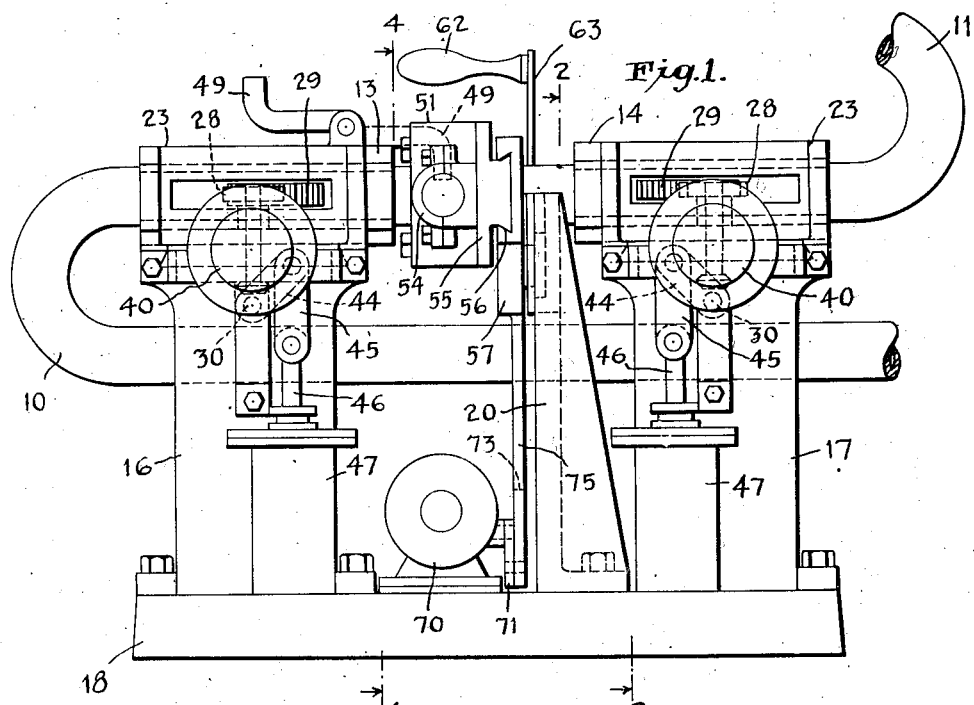
Fig. 1 is a side elevation of a welding machine embodying the invention.

Two sections of tubing 10 and 11 which are to be welded together are held in chucks 13 and 14, respectively. These chucks are supported on frames 16 and 17 secured to a common base 18. The chucks have a limited movement in their supporting frames for bringing the ends of the tubes together to make a weld. By having both chucks movable and shifting them at the same time, the opposing end faces of the pipes can be maintained in a symmetrical relation to the heating flames, with consequent equal intensity of heating on both faces as they are brought together.

A bracket 20 connected to the base 18 supports a torch for heating the ends of the tubes 10 and 11. This torch-holder and its operating mechanism will be described more fully in the explanation of Fig. 4.

Figure 2:
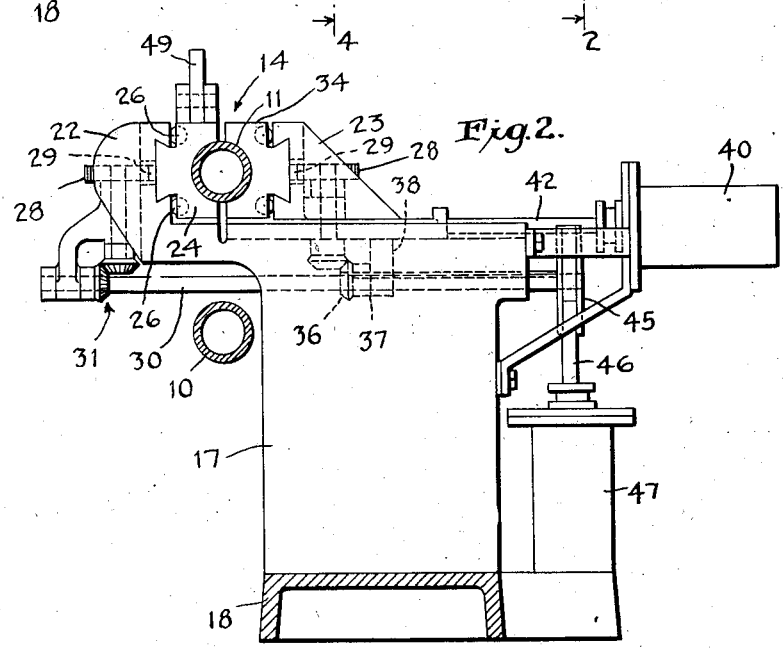
Fig. 2 is a sectional view on the line 2—2 of Fig. 3.

The frame 17 carries a fixed support 22 (Fig. 2) and a movable support 23. The chuck 14 has a jaw 24 connected to the fixed support 22 by a dove-tail bearing which permits movement of the jaw 24 lengthwise of the tubes. Anti-friction bearings 26 retained by the jaw 24 bear against the face of the fixed support.

The jaw 24 is moved by a pinion 28 which meshes with a racket 29 fixed to the jaw 24. The pinion 28 is driven from a shaft 30 through bevel gears 31.

The chuck 14 has a jaw 34 connected to the movable support 23 by a dove-tail bearing and movable lengthwise of the tubes by rack and pinion mechanism which is driven from a bevel gear 36 on the shaft 30. This bevel gear 36 turns in a bearing 37 carried by a bracket 38 depending from the movable support 23. The gear 36 slides axially on a splined portion of the shaft 30 when the movable support 23 slides lengthwise of the shaft and normal to the axis of the tubing to open or close the jaws of the chuck 14.

The chuck 14 is opened and closed, and is held closed under pressure, by a hydraulic motor 40 of the cylinder and piston type. This motor is supported on bracket extensions of the frame 17, and is connected to the movable support 23 by a piston rod 42.

The construction of the chuck 14 (Fig. 1) is similar to that of the chuck 13 already described, and the jaws are moved by similar mechanism which is indicated by the same reference characters.

The shafts 30 are turned by cranks 44 to move the chucks 13 and 14 toward each other to bring the ends of the tubes 10 and 11 together to make a weld. Each of the cranks 44 is connected by a link 45 to the piston rod 46 of a cylinder and piston hydraulic motor 47. The speed of these hydraulic motors can be controlled to move the ends of the tubes toward each other gradually and thereby avoid spatter or flash.

A work-limit gauge 49 is hinged to the chuck 13 and is moved into the dotted line position shown in Fig. 1 before the tubes are gripped by the chucks. Each tube is pushed through its chuck until the end of the tube abuts against the work-limit gauge 49. The chuck jaws are then clamped against the tubes, the ends of which are in correct position to be heated by the torch. After the tubes are gripped by the chucks, the gauge 49 is turned back into the full-line position shown in Fig. 1.

The torch for heating the ends of the tubes is made in two sections which fit together to completely surround the tubes. The tip or burner portion of the torch comprises a right burner block 51 and a left burner block 52. The burner block 51 is connected with a stock 53 held in a clamp 54 on a slide 55. This slide 55 is supported for lateral movement in a dove-tail bearing 56 (Fig. 1) by a frame 57.

Referring again to Figs. 3 and 4, the burner block 52 has a stock clamped to a slide 60 which is supported by and movable laterally on the frame 57. The slides 55 and 60 are moved toward and from one another to separate the burner blocks 51 and 52 when tubes are to be placed in the machine, and to move the blocks into contact after the ends of the tubes are in position to be heated and the limit gauge 49 has been withdrawn.

The slides 55 and 60 are moved by means of a handle 62 at one end of a lever 63 which is fulcrumed intermediate its ends to a bracket 64 extending from the frame 57. The slide 55 is connected with the lower end of the lever 63 by a link 66, and the slide 60 is connected with the lever 63, above its fulcrum, by a link 67. Movement of the handle 62 toward the right brings the burner blocks 51 and 52 together, and movement towards the left separates them.

The frame 57 is supported by the bracket 20 (Figs. 1 and 3) on an arcuate undercut bearing 69 on which the frame is free to oscillate about the axis of the piping as a center. Such oscillating movement is imparted to the frame 57 by a motor 70 which drives a crank 71 through reduction gearing 72. The crank 71 has a pin working in a slot 73 of an arm 75 rigidly connected with the frame 57. The speed of the motor 70 is regulated by a governor 76.

Figs. 5-9 show the construction of the torch. The inner face of the torch is recessed to form a chamber 78 which surrounds the tubes adjacent the ends to be welded. The flame jets issue from the sloping side walls of the chamber 78. A number of jet orifices 80 at spaced points around the torch slope in a direction to direct flame jets against the end of the tube 10, as illustrated in Fig. 6.

Grooves 82 extending from the chamber 78 to a side face of the burner blocks and located in front of the jet orifices 80 provide an escape for the products of combustion of the flame jets which issue from the orifices 80. These gases moving across the surface of the tubing back of the end heat the metal adjacent the end and this reduces the heat lost from the end face by conduction. Up to the time that the ends of the tubes 10 and 11 move into contact, a portion of the envelope gas from the torches enters the tubes. This is advantageous because it heats the inside of the tubes and the reducing action of the envelope gases protects the ends and inner surfaces from oxidation.

Jet orifices 84 (Fig. 8) open through the other sloping wall of the chamber 78 and direct flame jets against the end of the tube 11. Grooves 85 in front of the jet orifices 84 provide exhaust conduits for the envelope gases. Air for the combustion of the envelope gases is entrained through air ducts 86 (Fig. 9) on both sides of each jet orifice.

Oxygen and fuel gas is supplied to the burner block 51 from the stock 53 (Fig. 6). The orifices 80 open into a gas chamber 88, and the orifices 84 into a gas chamber 89. The gas chambers are grooves in the outer faces of the torch block closed by plates 90. These gas chambers 88 and 89 are connected by a cross conduit 91, which communicates with the gas conduit through the torch stock 53. The construction of the other torch block is similar and its description unnecessary except to point out that the upper torch block 51 has a groove into which a tongue 93 extends to hold the two sections of the torch in perfect alinement. The gas chambers of the two sections of torch are independent.

The burner blocks 51 and 52 and the upper portions of the torch stocks are water cooled. Cooling passages 95 in the burner blocks are supplied with water from pipes 96. The water outlet connection has a pipe 98 connecting with a water-jacket 99 around the stock of the torch.

The operation of the invention is as follows:

With the burner blocks of the torch moved apart and the limit gauge 49 in the dotted-line position shown in Fig. 1, the tubes 10 and 11 are put in the chucks 13 and 14, respectively, and pushed into contact with the limit gauge 49. The motors 40 are operated to close the chucks and firmly clamp the tubes.

The limit gauge 49 is then turned back into the full-line position to get it out of the way of the torch, and the handle 62 is moved to the right in Fig. 4 to bring the torch blocks 51 and 52 together around the ends of the tubes. The friction of the slides and operating mechanism is sufficient to hold the torch blocks together, but releasable latching or locking means can be provided for holding the torch sections together.

While the burner blocks direct flame jets against the ends of the tubes, the motor 70 is operated to rock the frame 57 through an angle at least as great as the angular distance between adjacent flame jets which are directed against the same end face of the tubing. This movement of the torch distributes the flame heating substantially uniformly over the entire areas of the end faces to be welded.

In addition to the heating which each circle of flame jets produces in the tube against which it is directed, the end of the other tube is heated by radiation from these flames. The loss of heat from the end faces by conduction through the metal of the tubing is reduced by the envelope gases which flow across both the inside and outside surfaces of the tubing and heat the metal back from the end faces.

The torch is allowed to heat the ends of the tubes for a definite period of time, depending upon the type of weld to be produced. The direct flame heating within a substantially closed space permits a positive control of the heating so that timing of the operation is practical. Oxygen in excess of that required for the primary combustion of the acetylene may be employed to increase the heating effect of the torch in controlling the torch operation.

After the ends of the tubes have been heated for a definite length of time, depending on the type of weld desired, the motors 47 are operated to move the chucks 13 and 14 toward one another and bring the ends of the tubes into contact. The motors 47 can be made to operate at any desired speed, but one of the features of the invention is that these motors can be controlled to move the tube ends into contact slowly enough to avoid spatter or splash of metal when making fusion welds.

The tube ends are subject to additional heating and are enveloped by the products of combustion during all of the time that the chucks are moving the tubes together. This heating period must be taken into account in determining how long a heating period to allow before starting the motors 47.

The preferred embodiment of the invention has been described but various changes and modifications can be made, and some features can be used alone without departing from the invention as defined in the claims.

I claim:

1. Apparatus for welding tube ends which comprises means for directing separate systems of flame jets against the end face of each tube at points spaced around the circular extent of the faces and while said faces are spaced from one another, surfaces partially enclosing the space between the tube ends, and guide surfaces partially enclosing the outside areas of the tubes adjacent their ends and being substantially concentric with said areas for confining and guiding the products of combustion from said jets across the metal of the tube ends axially away from said ends to heat said metal back of the end faces and reduce conduction losses from the end faces.

2. A welding torch for heating the opposing end faces of two tubes in making a butt-weld, said torch having a face curved to fit close to or against the outside surface of the tubes to be welded, a recess in the face adapted to overlie the circumferential opening between the opposed tube ends, jet orifices opening through the walls of said recess and disposed to direct flame jets obliquely downward to heat the opposing faces of the tube ends, and a groove in the torch face opposite each of the jet orifices and leading from the recess to an outer edge of the torch face to provide an exhaust passage through which products of combustion from that jet flow from the recess along the surfaces of the tubes.

3. Apparatus for butt-welding tube ends including a torch having a circular row of jet orifices for directing flames against the end face of a tube, another circular row of jet orifices in staggered relation to the first row and disposed to direct flames against the face of a tube end which is in substantial alinement with, but spaced from, the first tube, passages adjacent each jet orifice for admitting air to support the combustion of the flame jet issuing from that orifice, and a groove in the torch face opposite each flame jet for the exhaust of the products of combustion from that jet.

4. Apparatus for welding the ends of tubing including a torch comprising separate sections having curved burner blocks adapted to fit together around the confronting faces of the tubes to be welded, a separate support for each section of the torch, mechanism for moving the supports with respect to one another to bring the torch sections together or move them apart, bearings on which the torch supports are movable about the axis of the tube as a center, and means for rocking both supports as a unit on said bearings to cause both sections of the torch to oscillate about the tube axis and distribute the heating uniformly over the surfaces of the tube ends.

5. Tube welding apparatus including a frame, two alined chucks supported by the frame and adapted to hold tubes with their ends in confronting relation midway between the chucks, a limit gauge to block further movement of a tube which is pushed through either chuck into an initial position before the chucks are closed, said limit gauge being movable away from the tube ends to avoid obstructing them after the tubes are clamped in the chucks, mechanism for moving heating apparatus into position to heat the ends of the tubes, and power mechanism for moving the chucks toward one another after the tube ends have been heated, said power mechanism including motor means of such a nature that a slow movement can be imparted to both chucks.

6. Apparatus for welding separate lengths of tubing together in end to end abutment, including in combination torch means with separate systems of jet orifices so spaced and disposed in such angular relation to each other that they direct flame jets against the faces of both of the confronting tube ends while said faces are moving toward one another and up until the time that said faces are in contact, separate chucks for holding the respective tubes, and devices for simultaneously and gradually moving both chucks with respect to the torch means at substantially equal rates of speed toward each other and finally into contact while maintaining both tube ends in a symmetrical relation to the torch means, said devices comprising hydraulic motor means which move the chucks together with slow motion and avoid splatter of the molten metal when the end faces of the tubes contact with one another.

7. A welding torch including a plurality of burner blocks having faces curved to fit closely around the outside surface of two alined tubes with said faces extending generally parallel to the sides of the tubes for a substantial distance along the end portions of the two tubes when said tubes are disposed in axial alinement but with their ends separated to admit flame jets, and a plurality of jet orifices in each of said faces with alternate orifices disposed obliquely in opposite directions toward one another for heating the confronting ends of the spaced tubes, the length of the faces being sufficient to make said faces serve to confine and guide the products of combustion across the outside surfaces of both tubes back of their spaced ends.

8. A welding torch having a face curved to fit closely around the outside surface of the tubes to be welded, said face having a recess with a plurality of jet orifices in the walls of said recess, and having passages in said face extending substantially parallel to the surface of the tubes and leading from one end of the torch to said recess in the region of the jet orifices for supplying air to support combustion within the recess.

JAMES L. ANDERSON.